United States Patent
Eich et al.

(10) Patent No.: US 8,052,579 B2
(45) Date of Patent: Nov. 8, 2011

(54) METHOD FOR CHECKING THE PLAUSIBILITY OF THE POSITION OF THE CLUTCH ACTUATOR OF A CLUTCH, METHOD FOR DETERMINING THE TOUCH POINT OF A CLUTCH, AND DEVICE FOR CARRYING OUT THE METHOD

(75) Inventors: Juergen Eich, Buehl (DE); Ekkehard Reibold, Lahr (DE); Minh Nam Nguyen, Buehl (DE); Matthias Panzer, Karlsuhe (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 727 days.

(21) Appl. No.: 12/156,188

(22) Filed: May 30, 2008

(65) Prior Publication Data
US 2008/0305931 A1    Dec. 11, 2008

(30) Foreign Application Priority Data
May 31, 2007    (DE) .......................... 10 2007 025 412

(51) Int. Cl.
*B60W 10/02*    (2006.01)
(52) U.S. Cl. .......................... 477/175; 477/180; 477/181
(58) Field of Classification Search .................. 477/174, 477/175, 180, 181
See application file for complete search history.

(56) References Cited

U.S. PATENT DOCUMENTS

| | | | | |
|---|---|---|---|---|
| 5,378,211 A | * | 1/1995 | Slicker et al. ................. | 477/175 |
| 5,393,274 A | * | 2/1995 | Smedley ......................... | 477/74 |
| 5,411,124 A | * | 5/1995 | Olson ......................... | 192/103 R |
| 5,624,350 A | * | 4/1997 | Bates ............................... | 477/78 |
| 5,630,773 A | * | 5/1997 | Slicker et al. ................. | 477/176 |
| 2010/0049412 A1 | * | 2/2010 | Otsubo .......................... | 701/59 |

* cited by examiner

*Primary Examiner* — Ha D. Ho
(74) *Attorney, Agent, or Firm* — Davidson, Davidson & Kappel, LLC

(57) ABSTRACT

A method for checking the plausibility of an actuation position of a clutch of a double-clutch transmission operated by an actuator, including the following steps: disengaging the clutch assigned to the currently active old subtransmission and simultaneously engaging the clutch assigned to the other subtransmission to shift from the gear selected in the old subtransmission to a gear selected in the other, new subtransmission; deselecting the gear selected in the old subtransmission still during the overlapping operation of the clutches or immediately thereafter; detecting the difference between the speed of rotation of a drive shaft of the double-clutch transmission driven by a drive motor and the speed of rotation of the input shaft of the old subtransmission; and evaluating the state of the clutch assigned to the old subtransmission as disengaged when the difference in speeds of rotation exceeds a predetermined value within a predetermined time after deselection of the gear.

11 Claims, 4 Drawing Sheets

METHOD FOR CHECKING THE PLAUSIBILITY OF THE POSITION OF THE CLUTCH ACTUATOR OF A CLUTCH, METHOD FOR DETERMINING THE TOUCH POINT OF A CLUTCH, AND DEVICE FOR CARRYING OUT THE METHOD

This claims benefit of German Patent Application 10 2007 025 412.3, filed May 31, 2007, and hereby incorporated by reference herein.

BACKGROUND

The invention relates to a method for checking the plausibility of the position of the clutch actuator of a clutch contained in a dual clutch transmission. The invention also relates to a method for determining the touch point of a clutch operated by an actuator. In addition, the invention relates to a device for carrying out the method.

In modern motor vehicles, automated clutches, i.e. clutches operated by an actuator, are being used increasingly. The position of the actuating element of the clutch or of the actuator is detected in most cases with the aid of an increment meter, which directly supplies only information about actuator travel paths just traversed, but not information about the absolute position of the actuating element. In order to find the absolute position, a referencing is necessary, in which the actuator moves to a predetermined actuation position of the clutch and the current counter status of the increment meter is read.

A fundamental problem of such incremental travel measurements is their dependence on exact determination of the reference position. This problem is exacerbated by the fact that when operating a motor vehicle one must always plan on the occurrence of error events, which can result in the absolute position of the clutch actuator or of the actuating element of the clutch, and hence also the clutch torque set by the actuator in the electronic control device, no longer being known. That can result in safety-critical events, for example drive-off when travel is not wanted. Especially safety-critical is exact knowledge of the current actuating position of the clutch in a dual clutch transmission, in which two clutches must be actuated in precise coordination with each other.

SUMMARY OF THE INVENTION

An object of the present invention is to indicate possibilities for how the reliability of clutch operation can be improved.

An embodiment of the present invention provides a method to reliably detect whether a particular one of the clutches of the double-clutch transmission is actually disengaged when it is supposed to have been directed to the disengaged state by a control device of the double-clutch transmission.

A method for checking the plausibility of an actuation position of a clutch operated by an actuator includes the following steps:
disengaging the clutch assigned to the currently active old subtransmission and simultaneously engaging the clutch assigned to the other subtransmission to shift from the gear selected in the old subtransmission to a gear selected in the other, new subtransmission,
deselecting the gear selected in the old subtransmission still during the overlapping operation of the clutches or immediately thereafter,
detecting the difference between the speed of rotation of a drive shaft of the double-clutch transmission driven by a drive motor and the speed of rotation of the input shaft of the old subtransmission, and
evaluating the state of the clutch assigned to the old subtransmission as disengaged when the difference in speeds of rotation exceeds a predetermined value within a predetermined time after deselection of the gear.

Advantageously, with a clutch engaged and assigned to the new subtransmission, a new gear may be selected in the old subtransmission and the selectability of the new gear may be evaluated as a disengaged state of the clutch assigned to the old subtransmission.

In a highly preferred method according to the present invention, the ratio of the speed of the driveshaft of the double-clutch transmission to that of the input shaft of the new subtransmission may be registered, and conclusions may be drawn from the ratio about the disengaged state of the clutch assigned to the old subtransmission and/or the engaged state of the clutch assigned to the new transmission.

The clutch assigned to the old transmission, after being disengaged, may be gradually engaged with no gear selected in the old subtransmission, the pattern of the rotational speed of the input shaft of the old subtransmission may be registered, and the actuating position of the clutch at which a rapid change in the speed of rotation occurs, may be determined to be the touch point.

Another embodiment of the present invention provides that with the corresponding clutch disengaged, a higher gear may be selected in the old transmission than the gear selected in the new subtransmission, and the higher gear may be briefly synchronized so that the speed of the input shaft of the old subtransmission drops below that of the drive shaft, so that the input shaft of the old subtransmission rotates at a lower speed than the drive shaft as the clutch assigned to it gradually begins to engage.

Likewise, before the gradual engagement begins the speed of the drive shaft can be increased, so that as the gradual engagement of the clutch assigned to the old subtransmission begins the drive shaft may be turning at a higher speed than the input shaft of the old subtransmission.

While the speed of the drive shaft may be being increased it can be compared to the input shaft of the old subtransmission, and a change of the speeds in the same direction can be evaluated as a non-disengaged state of the clutch assigned to the old subtransmission.

Another advantageous embodiment of the present invention provides that when the old subtransmission may be in neutral the clutch assigned to the old transmission is at least partially engaged, such that the input shaft of the old subtransmission turns, the clutch may be disengaged, the speed of rotation of the input shaft may be registered, the clutch may be gradually engaged, and the actuating position at which the time gradient of the speed of the input shaft changes in a predefined manner during the gradual engaging of the clutch may be determined to be the touch point.

A method for determining the touch point of a clutch operated by an actuator, which clutch may be situated between a drive shaft that is drivable by a drive motor and an input shaft of a transmission, includes the following steps:
gradual engagement of the clutch with the transmission in neutral gear and the drive shaft being turned,
detection of the speed of rotation of the input shaft, and
determination of the actuation position of the clutch at which the speed of rotation of the input shaft changes in a predefined manner as the touch point.

Advantageously, when the transmission is in neutral gear the clutch may be at least partially engaged, so that the input shaft turns, the clutch may be disengaged, the speed of the input shaft may be registered, the clutch may be gradually engaged, and the actuating position of the clutch at which the time gradient of the speed of rotation of the input shaft may change in a predefined manner during the gradual engaging of the clutch may be determined to be the touch point.

A device to control the actuator for operating a clutch, which may be situated between a drive shaft drivable by a drive motor and an input shaft of a transmission, contains includes sensors to register the speed of rotation of the drive shaft and the input shaft, and an electronic control device connected to the sensors which controls the actuator in accordance with a method according to one of the present invention.

BRIEF DESCRIPTION OF THE DRAWINGS

The invention will be described below on the basis of schematic drawings in exemplary form and with additional details.

The figures depict the following.

DETAILED DESCRIPTION

Figure 1:
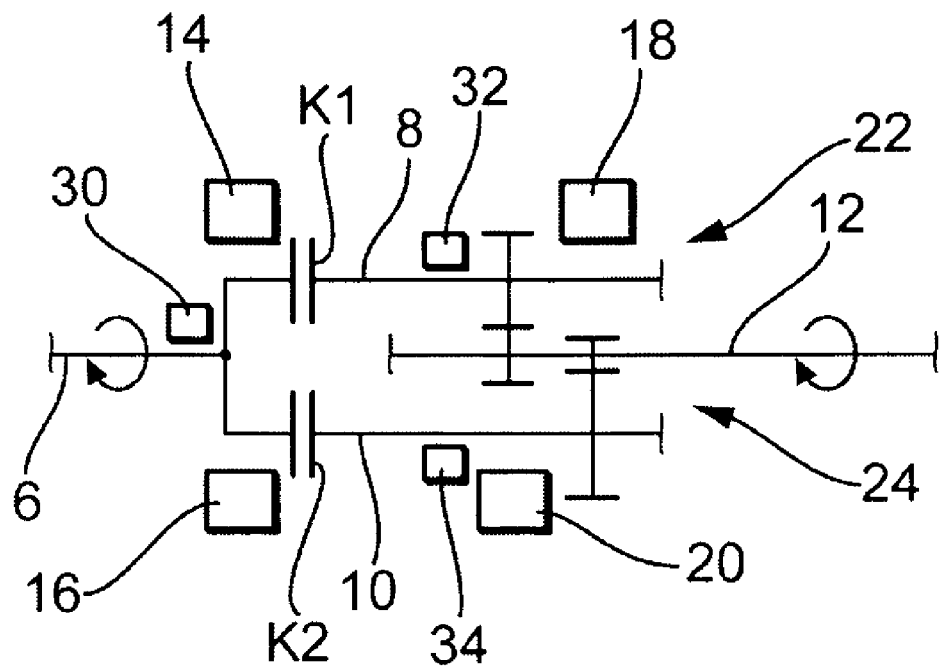
FIG. 1: a block diagram of a double-clutch transmission of known construction with associated electronic control device.
Figure 1:
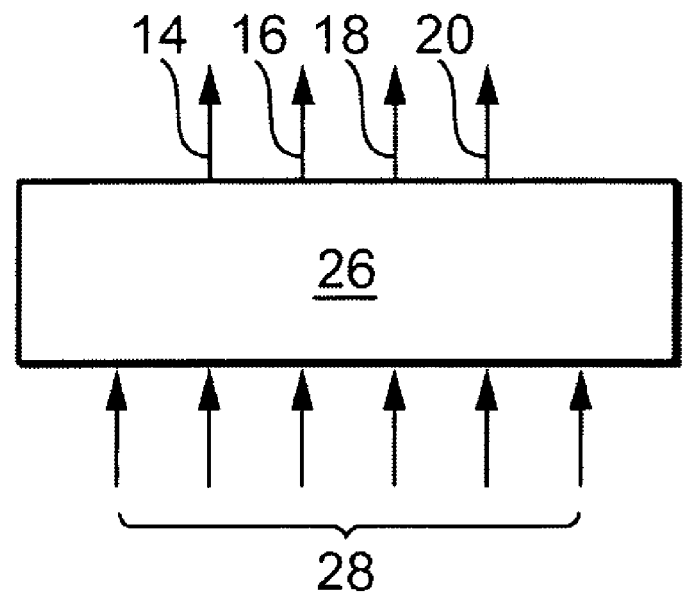

According to FIG. 1, a known double-clutch or parallel shift transmission has a drive shaft 6 driven for example by a combustion engine, which is optionally connectable with rotationally fixed connections to two input shafts 8 and 10. The flow of torque from drive shaft 6 into input shafts 8 and 10 is selectively controllable through clutches K1 and K2, respectively. Between input shaft 8 and an output shaft 12 various transmission ratios are activatable via gear pairings, only one of which is illustrated. Various gear pairings are likewise activatable between input shaft 10 and output shaft 12, only one of which is illustrated. Actuators 14 and 16 are provided to operate the clutches K1 and K2. To activate the gear pairings, for example to produce a rotationally fixed connection between the gear situated on input shaft 8 or 10 with the respective input shaft 8 or 10, which meshes with a particular gear that has a constant rotationally fixed connection with output shaft 12, actuators 18 and 20 are provided, each of which may include for example an activation actuator and a selection actuator. Overall, input shaft 8 and output shaft 12 as well as input shaft 10 and output shaft 12 each form a subtransmission 22 or 24 respectively of the double-clutch transmission.

The actuators 14, 16, 18 and 20 are addressed by an electronic control device 26 with microprocessor and associated program and data storage elements, whose outputs each address one of the actuators and whose inputs 28 are connected to sensors 30, 32 and 34, which register the speed of rotation of drive shaft 6, input shaft 8 and input shaft 10, as well as additional sensors to register operating parameters of the vehicle power train, for example a sensor to register the speed of the driven vehicle wheels, a sensor to register the position of a gear selector lever, a sensor to register the position of an accelerator pedal, etc. The depicted control device 26 can be connected through a bus system to additional control devices of the vehicle, for example an engine controller by which a power setting unit of the engine is controlled. The actuators can be in the form of lever actuators, for example, which are actuated for example by electric motors, where the revolution of each electric motor is registered by an incremental counter.

The torque transmissible by a particular clutch is important for the function of the clutch, and is stored in a memory element of the control device 26 as a curve, which indicates the transmissible clutch torque depending on the position of a clutch positioning element, for example a clutch lever. When the functional state of the clutch changes through wear and the like, the characteristic curve must be updated which is accomplished through an adaptation procedure, to which end for example the touch point of the clutch is checked while driving and must be adjusted to any resulting changes in the clutch properties.

In the double-clutch transmission depicted in FIG. 1, a gear can be selected in the particular subtransmission 22 or 24 whose clutch is disengaged, while the effective transmission ratio of the transmission is determined by the (active) subtransmission whose clutch is engaged. If a gear is selected for example in subtransmission 22 and clutch K1 is engaged, then this gear determines the transmission ratio between drive shaft 6 and output shaft 12. At the same time, a newly activatable gear can be selected in the other subtransmission 24. When shifting the transmission from the currently selected gear into the newly selected gear, clutch K1 must be disengaged and, for a connection between drive shaft 6 and output shaft 12 without interruption of traction, clutch K2 must be overlappingly engaged. When clutch K2 takes over the transmission of torque, if at least one of the clutches K1, K2 were not slipping at the same time the transmission would be destroyed through overspecification of the transmission ratios. Therefore, if both clutches K1, K2 are simultaneously engaged beyond their touch point, where the touch point is defined as that point at which the clutch starts to transmit torque as the engagement increases (a torque of a few Newton meters at most is transmitted at the touch point), at least part of the time a slipping state is produced in which at least one of the two clutches K1, K2 slips.

A conventional shifting sequence of a double-clutch transmission will be explained below on the basis of FIG. 2, where the abscissa depicts the time, for example in seconds. In Diagram a), curve I indicates the switch state of one of the subtransmissions, for example subtransmission 22, and curve II indicates the switch state of the other subtransmission, for example subtransmission 24.

In Diagram b), in which the ordinate indicates the transmissible torque, curve TK1 designates the torque transmissible by clutch K1 and curve TK2 the torque transmissible by clutch K2.

In Diagram c), in which the ordinate indicates a speed of rotation, curve N6 designates the speed of drive shaft 6, which is for example equal to the speed of the crankshaft of a combustion engine, curve N8 designates the speed of input shaft 8 and curve N10 designates the speed of input shaft 10.

Based on the diagram of FIG. 2, a shift from second gear to third gear followed by preselection shifting from second to fourth gear will be explained on the basis of the diagram of FIG. 2, with the time sequence between t=12 seconds and t=14.5 explained.

At time t=12 seconds, third gear is selected in first subtransmission 22 and second gear is selected in second subtransmission 24. At this time the engine torque is routed through second subtransmission 24, as can be recognized from the fact that the clutch torque is greater than 0, corresponding to the curve TK2.

At time t=12 a shifting process begins, wherein between t=12 seconds and t=12.5 seconds the clutch torque of clutch K2 decreases to 0, and overlapping, the clutch torque of clutch K1 increases. Starting at t=12.5 seconds the engine torque is routed through clutch K1 and subtransmission 22, so that the vehicle is traveling in third gear. Between time t=12.5 seconds and time t=13 seconds the engine speed N6 and the speed of rotation N8 of input shaft 8 of first subtransmission 22 are synchronized.

Between t=13.5 seconds and t=14 seconds a preselection shift into fourth gear occurs in second subtransmission 24, so that it will be possible later to continue shifting into this gear without an interruption of traction.

A shifting sequence according to the invention will now be explained on the basis of FIG. 3, which depicts curves corresponding to FIG. 2, where all actuations take place without error; that is, the respective clutch positions are stored correctly in control device 26 according to referencing, so that they can be actuated correctly.

Figure 2A:
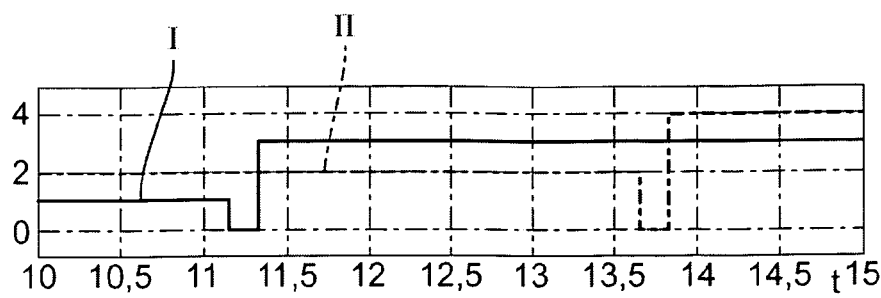
FIGS. 2 to 6: timing diagrams to explain various implementation forms of methods according to the invention.
Figure 2B:
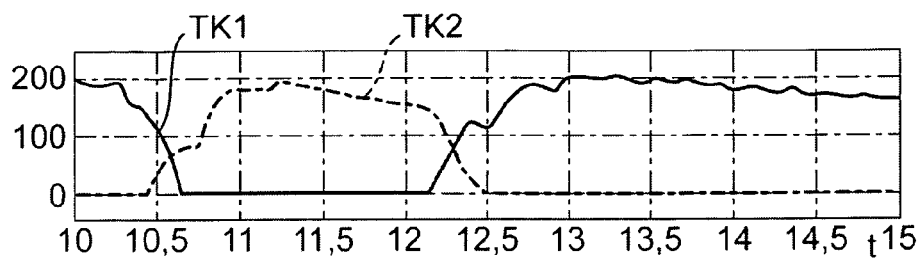
Figure 2C:
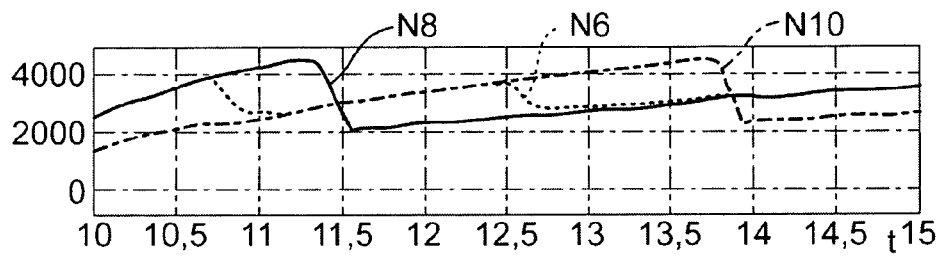
Figure 3A:
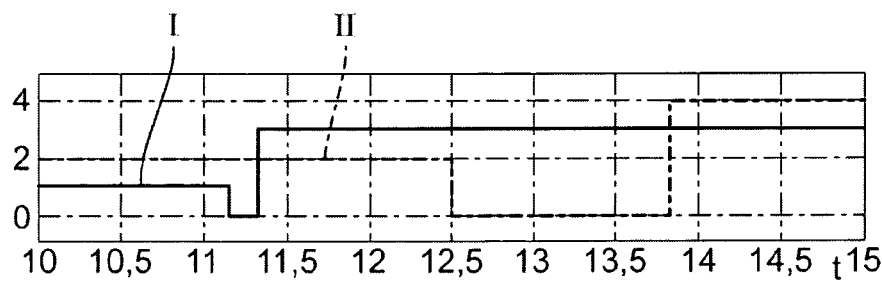
Figure 3B:
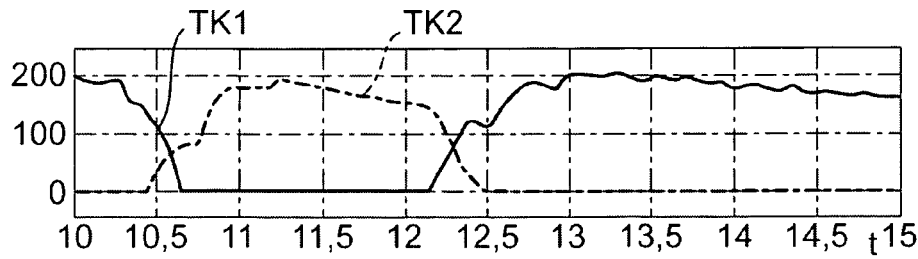
Figure 3C:
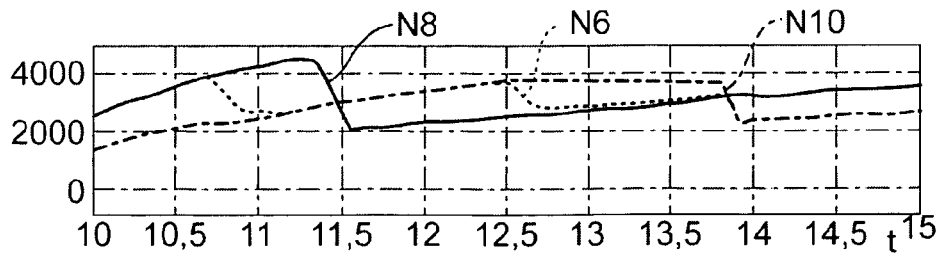

Contrary to the sequence according to FIG. 2, in the sequence according to FIG. 3 the gear of the subtransmission that is active before the shift (referred to in the claims as the old subtransmission) is deselected significantly earlier, for example immediately at the end of the overlap of the clutch actuation or directly thereafter, already at time t=12.5 seconds. This is accomplished by slightly pre-tensioning the shifting actuator in question, or deselecting it immediately after the actuation of the clutches ends, preferably just when clutch K2 is supposed to have reached its disengaged position. While according to the conventional shifting sequence depicted in FIG. 2 the speed of rotation N10 of the old subtransmission was determined in the time span from t=12.5 seconds to t=13.8 seconds by the vehicle speed and the gear selected up to that point, the early deselection of the gear in the old subtransmission causes the speed of rotation of the latter to be determined by the clutch torque, and possibly by components of drag torque. Under the condition that drag torques are small, it is therefore possible to test whether the clutch of the old subtransmission has actually been disengaged. In the example of FIG. 3, if clutch K2 is actually disengaged at time t=12.5 seconds, on condition that drag torques are small in the transmission a difference will arise between the speed of drive shaft 6 (N6) and the speed of input shaft 10 of the second subtransmission 24, which is now in neutral gear. Thus by registering the time pattern of the speed of input shaft 10 immediately after deselection of the gear in the second subtransmission (speed of rotation remains constant with clutch disengaged) or if appropriate also registering the speed of drive shaft 6 (difference between speed of drive shaft 6 and of input shaft 10 corresponds to the drop in speed of input shaft 6) it is possible to decide whether clutch K2 is actually disengaged.

Figure 4A:
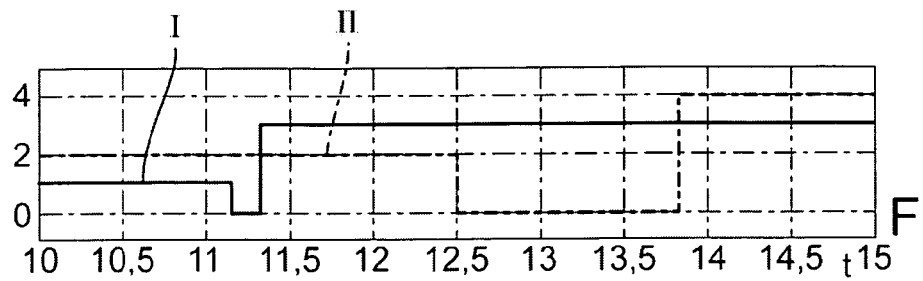
Figure 4B:
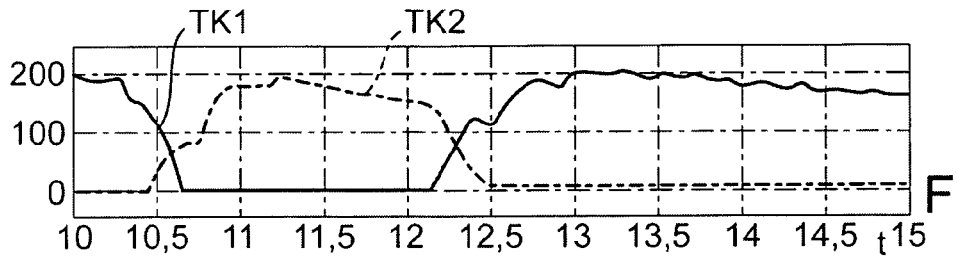
Figure 4C:
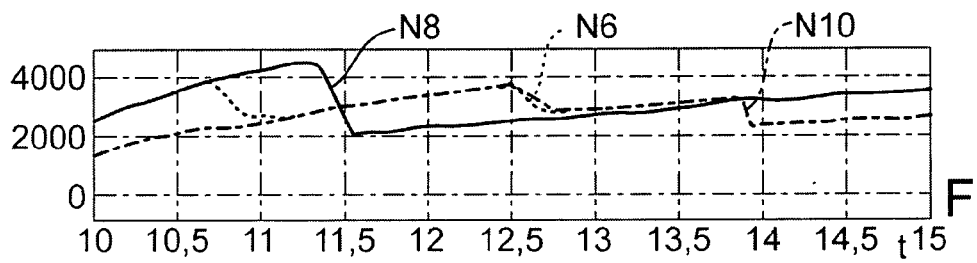

FIG. 4 depicts the circumstances of FIG. 3 for the case that clutch TK2 is again instructed to open, but actually does not open. As can be seen from curves N6 and N10, in this case the speed of rotation of input shaft 10 of the second subtransmission follows the speed of drive shaft 6, without any problems resulting because of no gear being selected in second subtransmission 24. However, the malfunction of clutch K2 is recognized immediately from the fact that there is no difference between the speeds of rotation of shafts 6 and 10. As a result of the early recognition of the malfunction in the actuation of clutch K2, protective or error-correcting measures can be taken before dangerous operating conditions develop.

While the forenamed procedure does make it possible to recognize a malfunction in the actuation of second clutch K2, it gives no indication of whether the absolute position of the clutch actuator stored in control device 26 is correct. An explanation of how the absolute position of an actuating element of the clutch or the position of the corresponding clutch actuator detected by an incremental counter can be registered in addition is given on the basis of FIG. 5. The processes of FIG. 5 correspond to those of FIG. 3, with which they are identical up to time t=13 seconds. As a modification of the controlling according to FIG. 3, in the controlling according to FIG. 5 clutch K2 of the "old" second subtransmission 24 is gradually engaged with moderate ramp speed starting at time t=13. During this gradual engagement the rotational speed signal from rotational speed sensor 34 is monitored. As soon as that speed changes significantly in the direction of the speed of drive shaft 6, this is a sign that clutch K2 is transmitting torque, i.e. that it has been moved into the range of the touch point. The sudden decline in the speed of input shaft 10 (curve N10) while the clutch torque of clutch K2 rises (time approximately 13.2 seconds) can be evaluated as the touch point of clutch K2, or can be compared additionally with the touch point stored in the control device 26, whereupon a positive comparison can lead to the conclusion that the stored touch point is still valid. Different interpreting algorithms can be used to evaluate the speed of rotation of input shaft 10, for example the sudden change in the speed of input shaft 10, or dropping below a difference between the speeds of input shaft 10 and of drive shaft 6.

It goes without saying that the previously stated method for checking the plausibility of the clutch actuation and/or for determining the touch point after shifting has occurred can be used both for subtransmission 22 and for subtransmission 24.

Figure 5A:
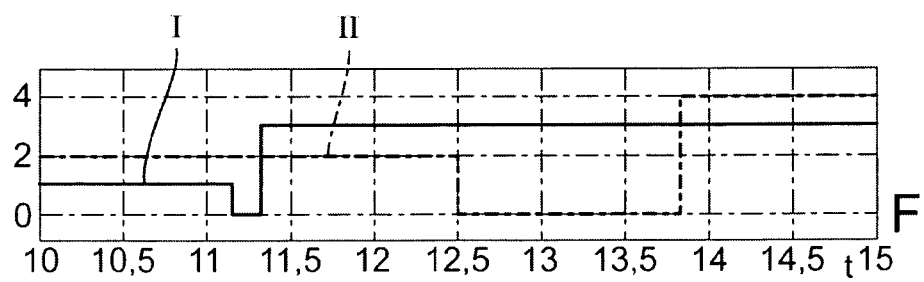
Figure 5B:
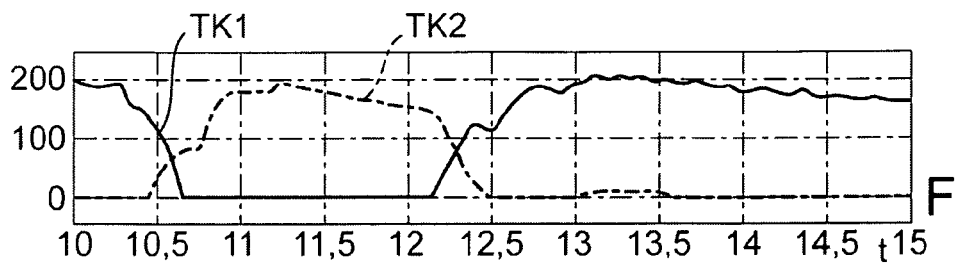
Figure 5C:
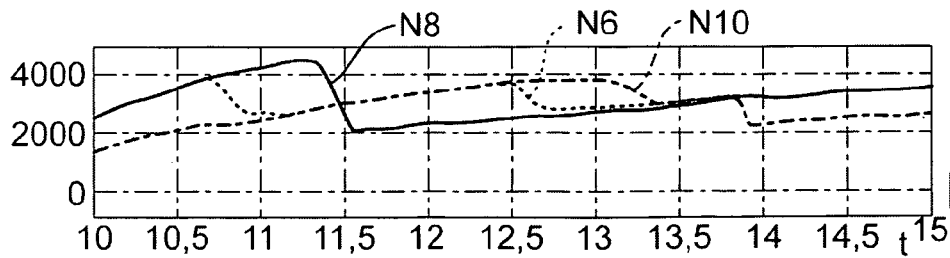

When determining the touch point, as described on the basis of FIG. 5, it has been found beneficial if the shaft whose speed of rotation is to change when the corresponding clutch is actuated is not retarded to lower speeds as the clutch is gradually engaged, as depicted in FIG. 5, but rather is accelerated to higher speeds. That makes it possible to minimize interfering influences of drag torque in the transmission on the previously described evaluation of the speed of rotation. In order to be able to accelerate the input shaft of a subtransmission by actuating the clutch, this input shaft of the subtransmission should be rotating more slowly than the drive shaft of the transmission (i.e. N8<N6 or N10<N6 should be achieved). One possibility for lowering the speed of rotation of input shaft 10 for example, is to select a gear in the inactive subtransmission with the clutch initially disengaged, which with full synchronization would result in a speed of rotation of input shaft 10 that is lower than the speed of drive shaft 6. Before the method described on the basis of FIG. 5 is carried out, whatever gear is next selected can be slightly desynchronized for this purpose, so that the speed of rotation of input shaft 10 is brought to a value which is equal to the speed of the output shaft divided by the transmission ratio. When the gear is desynchronized, shaft 10 is then brought to a speed that is correspondingly lower than the speed of drive shaft 6. The gear is then deselected and clutch K2 is gradually engaged somewhat, as depicted on the basis of FIG. 5. The speed of rotation of input shaft 10 is then not registered as the speed is decreasing, as depicted in FIG. 5c), but when the speed is increasing.

Another possibility for ensuring that the corresponding shaft is accelerated when the clutch is gradually engaged by a slight amount is to increase the engine speed or the speed of drive shaft 6 while the clutch of the active transmission is slipping correspondingly, so that the determination of the touch point as described earlier can take place with the shaft accelerated.

Increasing the speed of rotation of driveshaft 6 by means of an intervention in the drive motor can be used in addition to check the plausibility of the position of the clutch, which after all should be disengaged when the speed of drive shaft 6 is being increased. Because if the input shaft belonging to the disengaged clutch is turning faster corresponding to the increase in the speed of the drive shaft, this is an indication that the clutch is not disengaged, so that an error in the clutch actuation is detected.

A problem of the method described earlier for detecting the touch point of a clutch by registering the change in speed of rotation of the corresponding shaft is that the touch point thus recognized depends on an unknown drag torque acting on the particular shaft. In order to compensate for the influence of unknown drag torques, the particular input shaft can be set to rotating before the actual touch point determination. The influence of the drag torques is then determined with the clutch completely disengaged. A change in the speed of rotation of the particular shaft during a slow, gradual engagement of the clutch is finally used to determine the touch point.

The method will be explained on the basis of FIG. 6.

Figure 6A:
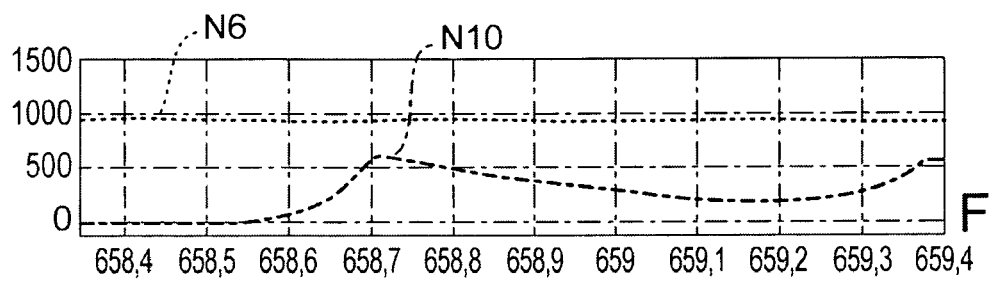
Figure 6B:
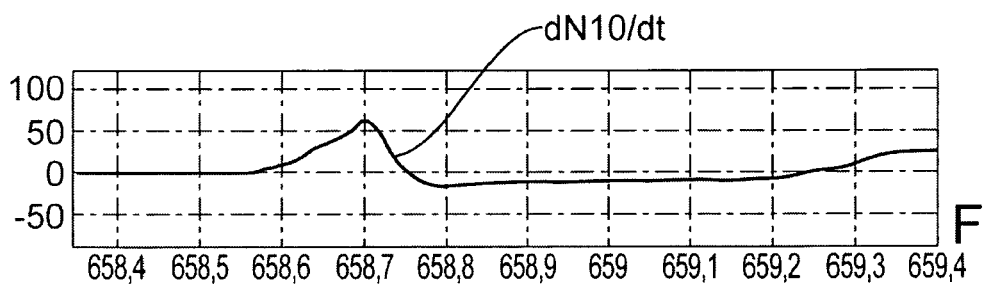
Figure 6C:
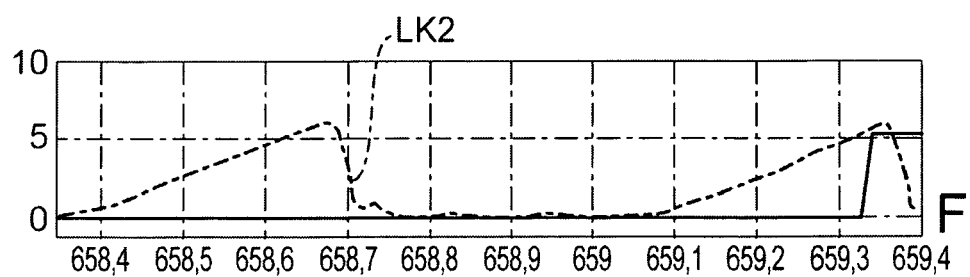

In the diagrams of FIG. 6 the time in seconds is shown on the abscissa, the ordinate of Diagram a) indicates a speed in rpm, the ordinate of Diagram b) indicates a time gradient of a speed of rotation, and the ordinate of Diagram c) indicates the travel of an actuator to actuate a clutch. Curve N6 indicates the speed of rotation of drive shaft 6. Curve N10 indicates the speed of rotation of transmission input shaft 10. Curve dN10/dt indicates the change over time of the speed of input shaft 10. Curve LK2 indicates the travel set at clutch 2.

Let it be assumed in a described case that neutral gear is selected in second subtransmission 24, clutch K2 is fully disengaged, and input shaft 10 is standing still. The combustion engine is running at idle speed, and drive shaft 6 is turning at the same speed.

To minimize the influence of drag torque, transmission input shaft 10 is set to rotating first, by beginning to turn input shaft 10 by slowly engaging the clutch (curve LK2). As soon as a defined minimum speed of rotation is reached, about 500 rpm in the illustrated example, clutch K2 in the illustrated example is completely disengaged again at time 658.68. After the clutch is disengaged, the gradient of the speed of rotation of input shaft 10 dN10/dt is determined for a short time and evaluated. That makes it possible to ascertain the effect of the unknown drag torque on the dynamics of input shaft 10.

For the subsequent actual touch point determination, the travel of clutch K2 is then controlled again with an appropriate ramp speed, starting for example at about time 659.1, as shown. As that is done, the gradient of the speed of rotation of input shaft 10 is again determined. As soon as this gradient changes by a defined value in comparison to the phase with the clutch disengaged, it can be concluded that the touch position has been reached. In the illustrated example this is the case at about time t=659.33. The clutch position reached at that time can be accepted as the touch position.

Along with the described purely empirical determination of the touch point, the equation of motion and the torque equilibrium at the input shaft 10 can also be calculated and an analytical correlation between the change in gradient and the touch torque can be derived.

It is not mandatory to utilize the forenamed method in a state in which the transmission input shaft 10 is stopped, which is the case for example when the vehicle is standing still, but rather it can also used in a moving vehicle, where the transmission input shaft never comes to a complete stop. The interfering influence of drag torque can also be compensated for here by evaluating the rotational speed gradient at the input shaft of the (sub-) transmission.

The method described above and others can be utilized not only for the clutches of double-clutch transmissions, but also—in particular with regard to determining the touch point—with conventional shift transmissions that are operated with only one clutch.

REFERENCE LABELS

| | |
|---|---|
| 6 | drive shaft |
| 8 | input shaft |
| 10 | input shaft |
| 12 | output shaft |
| 14 | actuator |
| 16 | actuator |
| 18 | actuator |
| 20 | actuator |
| 22 | subtransmission |
| 24 | subtransmission |
| 26 | control device |
| 28 | inputs |
| 30 | sensor |
| 32 | sensor |
| 34 | sensor |
| K1 | clutch |
| K2 | clutch |

What is claimed is:

1. A method for checking the plausibility of an actuation position of a clutch of a double-clutch transmission operated by an actuator, comprising the following steps:
    disengaging the clutch assigned to a currently active old subtransmission and simultaneously engaging the clutch assigned to a new subtransmission to shift from a gear selected in the old subtransmission to a gear selected in the new subtransmission;
    deselecting the gear selected in the old subtransmission during an overlapping operation of the clutches or immediately thereafter;
    detecting a difference between a speed of rotation of a drive shaft of the double-clutch transmission driven by a drive motor and a speed of rotation of an input shaft of the old subtransmission; and
    evaluating the state of the clutch assigned to the old subtransmission as disengaged when the difference in speeds of rotation of the drive shaft of the double-clutch transmission and the input shaft of the old subtransmission exceeds a predetermined value within a predetermined time after deselection of the gear.

2. The method according to claim 1 wherein with the clutch engaged and assigned to the new subtransmission, a new gear is selected in the old subtransmission and the selectability of the new gear is evaluated as a disengaged state of the clutch assigned to the old subtransmission.

3. The method according to claim 1 wherein a ratio of the speed of rotation of the drive shaft of the double-clutch transmission to that of the input shaft of the old subtransmission is registered, and conclusions are drawn from the ratio about the disengagement status of the clutch assigned to the old subtransmission.

4. The method according to claim 1 wherein the clutch assigned to the old transmission, after being disengaged, is gradually engaged with no gear selected in the old subtransmission, a pattern of the rotational speed of the input shaft of the old subtransmission is registered, and an actuating position of the clutch at which a rapid change in the speed of rotation occurs, is determined to be a touch point.

5. The method according to claim 4 wherein with the corresponding clutch disengaged, a higher gear is selected in the old subtransmission than the gear selected in the new subtransmission, and the higher gear is briefly synchronized so that the speed of the input shaft of the old subtransmission drops below that of the drive shaft, so that the input shaft of the old subtransmission rotates at a lower speed than the drive shaft as the corresponding clutch gradually begins to engage.

6. The method according to claim 4 wherein before the gradual engagement begins the speed of the drive shaft is increased so that as the gradual engagement of the clutch assigned to the old subtransmission begins the drive shaft is turning at a higher speed than the input shaft of the old subtransmission.

7. The method according to claim 6 wherein while the speed of the drive shaft is being increased the speed is compared to the input shaft of the old subtransmission, and a change of the speeds in the same direction is evaluated as a non-disengaged state of the clutch assigned to the old subtransmission.

8. The method according to claim 1 wherein, with the old subtransmission in neutral, the clutch assigned to the old transmission is at least partially engaged in such a way that the input shaft of the old subtransmission turns, the clutch is disengaged, the speed of rotation of the input shaft is registered, the clutch is gradually engaged, and an actuating position of the clutch at which a time gradient of the speed of rotation of the input shaft changes in a predefined manner during the gradual engagement of the clutch is determined to be a touch point.

9. The method according to claim 4 wherein the determined touch point position is used to check the plausibility of the clutch actuator position.

10. The method according to claim 1 wherein, with the transmission in neutral gear, the clutch is at least partially engaged in such a way that the input shaft turns,
the clutch is disengaged,
the speed of rotation of the input is registered and a gradient of the speed of rotation is determined,
the clutch is gradually engaged, and
that actuating position of the clutch at which the time gradient of the speed of rotation of the input shaft changes in a predefined manner during the gradual engagement of the clutch is determined to be a touch point.

11. A device for controlling an actuator for operating a clutch situated between a drive shaft drivable by a drive motor and an input shaft of a transmission, comprising:
sensors to register a speed of rotation of the drive shaft and of the input shaft, and an electronic control device connected to the sensors, the electronic control device controlling the actuator in accordance with the method according to claim 1.

* * * * *